US009925405B2

(12) United States Patent
Matthews

(10) Patent No.: US 9,925,405 B2
(45) Date of Patent: Mar. 27, 2018

(54) ANCHORED RESISTANCE EXERCISE DEVICE WITH SENSOR

(71) Applicant: Charles Konstantine Matthews, Brampton (CA)

(72) Inventor: Charles Konstantine Matthews, Brampton (CA)

( * ) Notice: Subject to any disclaimer, the term of this patent is extended or adjusted under 35 U.S.C. 154(b) by 62 days.

(21) Appl. No.: 15/154,531

(22) Filed: May 13, 2016

(65) Prior Publication Data

US 2016/0332027 A1    Nov. 17, 2016

Related U.S. Application Data

(60) Provisional application No. 62/162,653, filed on May 15, 2015.

(51) Int. Cl.
*A63B 71/00* (2006.01)
*A63B 21/02* (2006.01)
(Continued)

(52) U.S. Cl.
CPC ...... *A63B 21/0552* (2013.01); *A63B 21/0442* (2013.01); *A63B 21/4009* (2015.10); *A63B 21/4019* (2015.10); *A63B 21/4035* (2015.10); *A63B 23/1209* (2013.01); *G06Q 10/0639* (2013.01); *A63B 21/00065* (2013.01); *A63B 21/153* (2013.01); *A63B 21/1609* (2015.10); *A63B 21/169* (2015.10); *A63B 21/1645* (2013.01); *A63B 21/225* (2013.01); *A63B 21/4011* (2015.10); *A63B 23/03533* (2013.01); *A63B 23/03541* (2013.01);
(Continued)

(58) Field of Classification Search
CPC ............................ A63B 21/04; A63B 21/0442
See application file for complete search history.

(56) References Cited

U.S. PATENT DOCUMENTS 1,432,013 A    10/1922   Blake
4,441,707 A *  4/1984   Bosch ................. A63B 21/151
                                            482/131
(Continued)

FOREIGN PATENT DOCUMENTS

WO        2007141584 A3    12/2007

*Primary Examiner* — Nyca T Nguyen
(74) *Attorney, Agent, or Firm* — Steven M. Greenberg; CRGO Law

(57) ABSTRACT

An exercise system comprises an anchor and at least one extendible tether extending from a mooring on the anchor to a grip end. Each extendible tether is longitudinally movable between an extended configuration and a retracted configuration. At least one sensor alignment arm is movably coupled to the anchor, and a sensor is associated with each sensor alignment arm and extendible tether. The sensor alignment arm carries a first sensor element and the extendible tether carries a second sensor element. Each extendible tether is longitudinally movable relative to its sensor alignment arm and angular movement of the extendible tether relative to the anchor moves the sensor alignment arm to maintain longitudinal alignment between the first sensor element and the second sensor element. The sensor detects movement of the second sensor element past the first sensor element as the extendible tether moves between the extended configuration and the retracted configuration.

9 Claims, 10 Drawing Sheets

(51) Int. Cl.
  *A63B 21/04* (2006.01)
  *A63B 21/05* (2006.01)
  *A63B 21/055* (2006.01)
  *A63B 23/12* (2006.01)
  *G06Q 10/06* (2012.01)
  *A63B 69/00* (2006.01)
  *A63B 21/00* (2006.01)
  *A63B 21/16* (2006.01)
  *A63B 21/22* (2006.01)
  *A63B 23/035* (2006.01)
  *G06K 9/00* (2006.01)

(52) U.S. Cl.
  CPC ....... *A63B 23/1218* (2013.01); *A63B 23/1236* (2013.01); *A63B 69/004* (2013.01); *A63B 2209/10* (2013.01); *A63B 2220/13* (2013.01); *A63B 2220/17* (2013.01); *A63B 2220/36* (2013.01); *A63B 2220/40* (2013.01); *A63B 2220/801* (2013.01); *A63B 2225/50* (2013.01); *A63B 2230/06* (2013.01); *A63B 2230/75* (2013.01); *A63B 2244/102* (2013.01); *G06K 9/00342* (2013.01)

(56) References Cited

U.S. PATENT DOCUMENTS

| | | | |
|---|---|---|---|
| 5,234,395 A * | 8/1993 | Miller | A63B 21/018 482/114 |
| 5,362,295 A | 11/1994 | Nurge | |
| 9,272,178 B2 * | 3/2016 | Pinder | A63B 21/0407 |
| 2006/0199711 A1 * | 9/2006 | Miers | A63B 21/0552 482/124 |
| 2008/0119763 A1 * | 5/2008 | Wiener | A61B 5/224 600/587 |
| 2010/0041528 A1 | 2/2010 | Todd | |
| 2011/0230314 A1 * | 9/2011 | Hoffman | A63B 21/4009 482/51 |
| 2012/0245002 A1 * | 9/2012 | Todd | A63B 21/4025 482/124 |
| 2013/0281261 A1 * | 10/2013 | Gatherer | A63B 24/0006 482/8 |
| 2014/0018210 A1 * | 1/2014 | Lin | A63B 5/20 482/8 |
| 2014/0142864 A1 | 5/2014 | Spears et al. | |
| 2014/0323271 A1 * | 10/2014 | Hinds | A63B 21/0442 482/8 |
| 2016/0346601 A1 * | 12/2016 | Marcandelli | A63B 71/0622 |

* cited by examiner

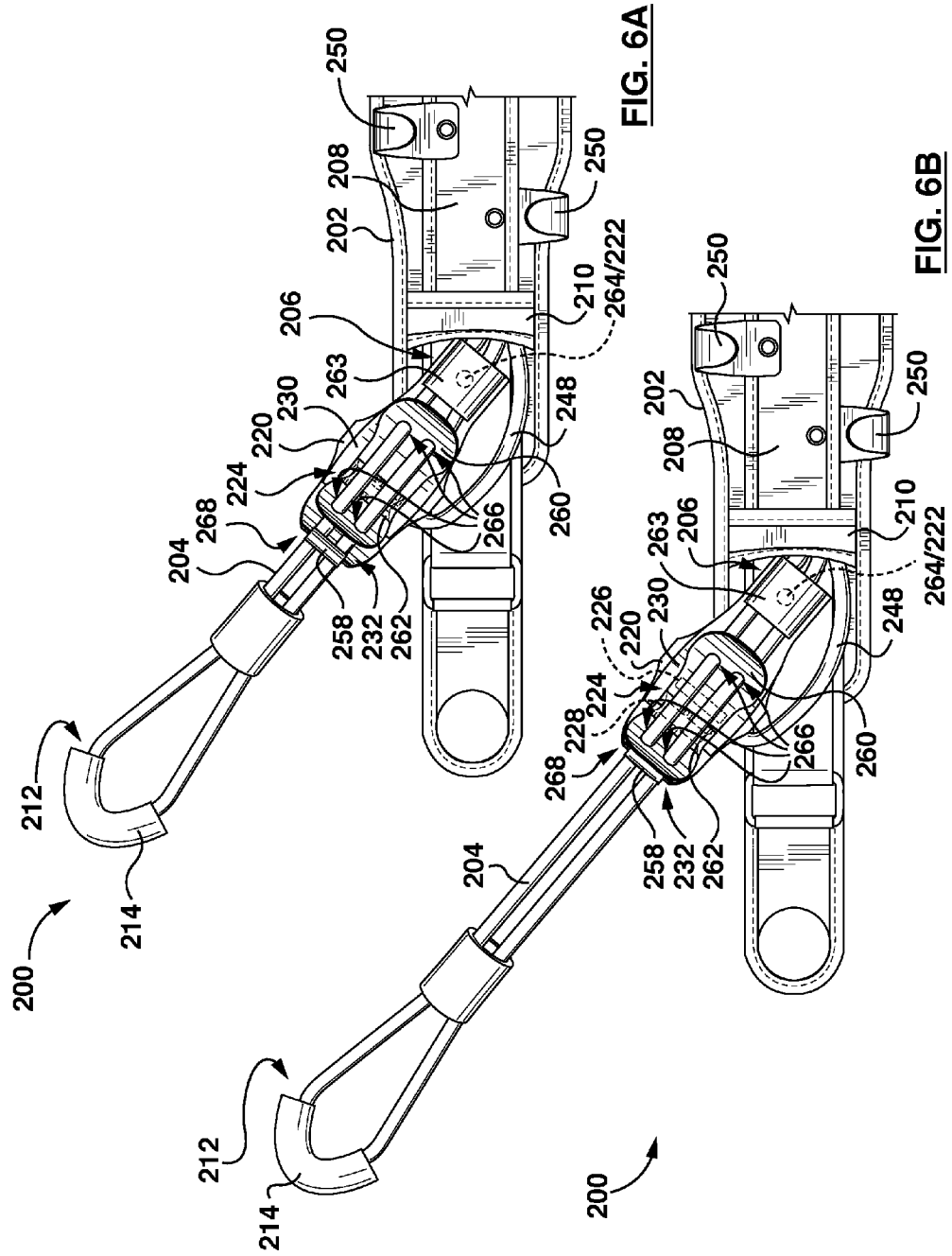

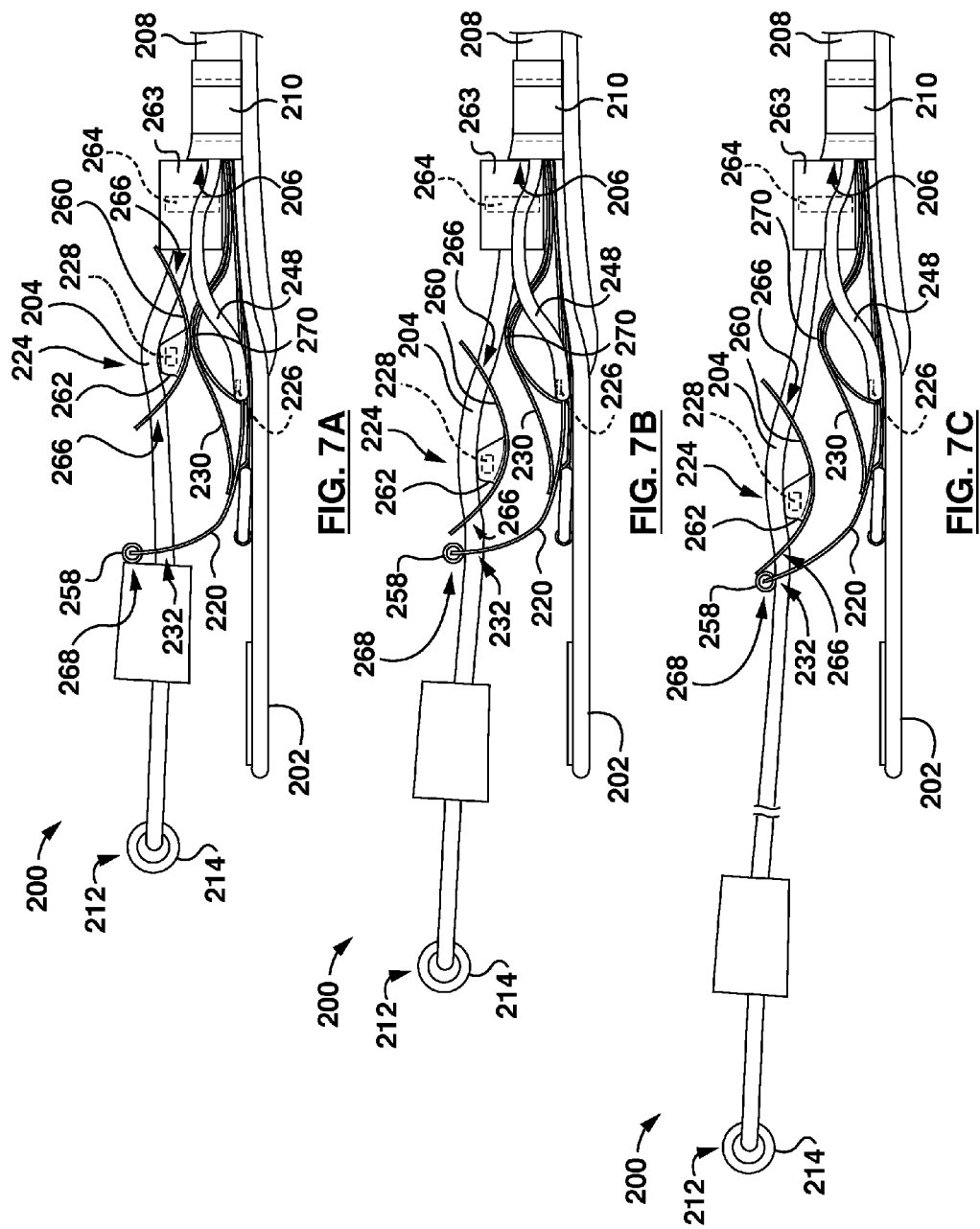

ANCHORED RESISTANCE EXERCISE DEVICE WITH SENSOR

CROSS-REFERENCE TO RELATED APPLICATION

This application claims priority to U.S. Provisional Application No. 62/162,653 filed on May 15, 2015, the teachings of which are hereby incorporated by reference.

TECHNICAL FIELD

The present disclosure relates to exercise equipment, and more particularly to resistance exercise equipment.

BACKGROUND

Exercise systems that incorporate an anchor and one or more extendible tethers coupled to the anchor to provide exercise resistance have been known for quite some time. For example, U.S. Pat. No. 1,432,013 to Herbert, U.S. Pat. No. 5,362,295 to Nurge and U.S. Patent Application Publication No. 2010/0041528 in the name of Todd disclose arrangements in which elastic cords are attached to a belt so that a user can use the cords to provide exercise resistance to arm movements. However, these arrangements do not gather data about exercise performance.

U.S. Patent Application Publication No. 2014/0142864 in the name of Spears et al. describes an exercise system comprising a belt and two resistive deformable elements connecting the belt to two handles. Although this document does describe collection of exercise data, it proposes a complicated sensor arrangement for achieving this purpose.

SUMMARY

Broadly speaking, exercise systems according to aspects of the present disclosure comprise an anchor, one or more extendible tethers coupled to the anchor, one or more two-element sensors for detecting movement of a respective tether, and one or more sensor alignment arms for maintaining alignment between the two elements of a respective sensor.

In one aspect, an exercise system comprises an anchor and at least one extendible tether coupled to the anchor and extending from a mooring on the anchor to a grip end having a grip element. Each extendible tether is longitudinally movable between an extended configuration and a retracted configuration. The exercise system further comprises at least one sensor alignment arm movably coupled to the anchor and at least one sensor. Each sensor is associated with a respective sensor alignment arm and extendible tether, and each sensor comprises a first sensor element and a second sensor element. The first sensor element is carried by the sensor alignment arm and the second sensor element is carried by the extendible tether. Each sensor alignment arm is movably coupled to a respective one of the at least one extendible tether so that the extendible tether is longitudinally movable relative to the sensor alignment arm and angular movement of the extendible tether relative to the anchor moves the sensor alignment arm relative to the anchor to maintain longitudinal alignment between the sensor alignment arm and the extendible tether and thereby maintain longitudinal alignment between the first sensor element and the second sensor element. Each sensor is configured or adapted to detect movement of the second sensor element past the first sensor element in at least a first longitudinal direction as the extendible tether moves between the extended configuration and the retracted configuration.

In some embodiments, the exercise system has two opposed extendible tethers, two opposed sensor alignment arms and two sensors.

In some embodiments, the anchor is a belt, and each extendible tether may comprise a resistance band. The exercise system may further comprise anchor points on the belt for receiving additional resistance bands.

In some embodiments, the sensor(s) may be coupled to an external computing device. The external computing device may be releasably carried by the anchor. In other embodiments, the sensor(s) may be coupled to a wireless transmitter, which may be carried by the anchor.

In one particular embodiment, the anchor is a belt and two extendible tethers in the form of resistance bands are secured to the belt so that the resistance bands extend from the user's hips or waist when the belt is worn. Such an embodiment has particular application to boxing and mixed-martial-art (MMA) training, although it is not limited to such applications and can be used in support of a wide variety of training activities.

BRIEF DESCRIPTION OF THE DRAWINGS

These and other features will become more apparent from the following description in which reference is made to the appended drawings wherein:

FIG. 6A shows a portion of the exercise system of FIG. 5A with the extendible tether and associated sensor alignment arm in a second angular position with the extendible tether moving between the retracted configuration and the extended configuration;

FIG. 6B shows a portion of the exercise system of FIG. 5A with the extendible tether and associated sensor alignment arm in the second angular position with the extendible tether in the extended configuration;

FIG. 7A is a bottom plan view showing a portion of the exercise system of FIG. 5A with an extendible tether and associated sensor alignment arm in the first angular position with the extendible tether in a retracted configuration;

FIG. 7B is a bottom plan view showing a portion of the exercise system of FIG. 5A with the extendible tether and associated sensor alignment arm in the first angular position with the extendible tether moving between the retracted configuration and an extended configuration; and FIG. 7C is a bottom plan view showing a portion of the exercise system of FIG. 5A with the extendible tether and associated sensor alignment arm in the first angular position with the extendible tether in the extended configuration.

DETAILED DESCRIPTION

Figure 1:
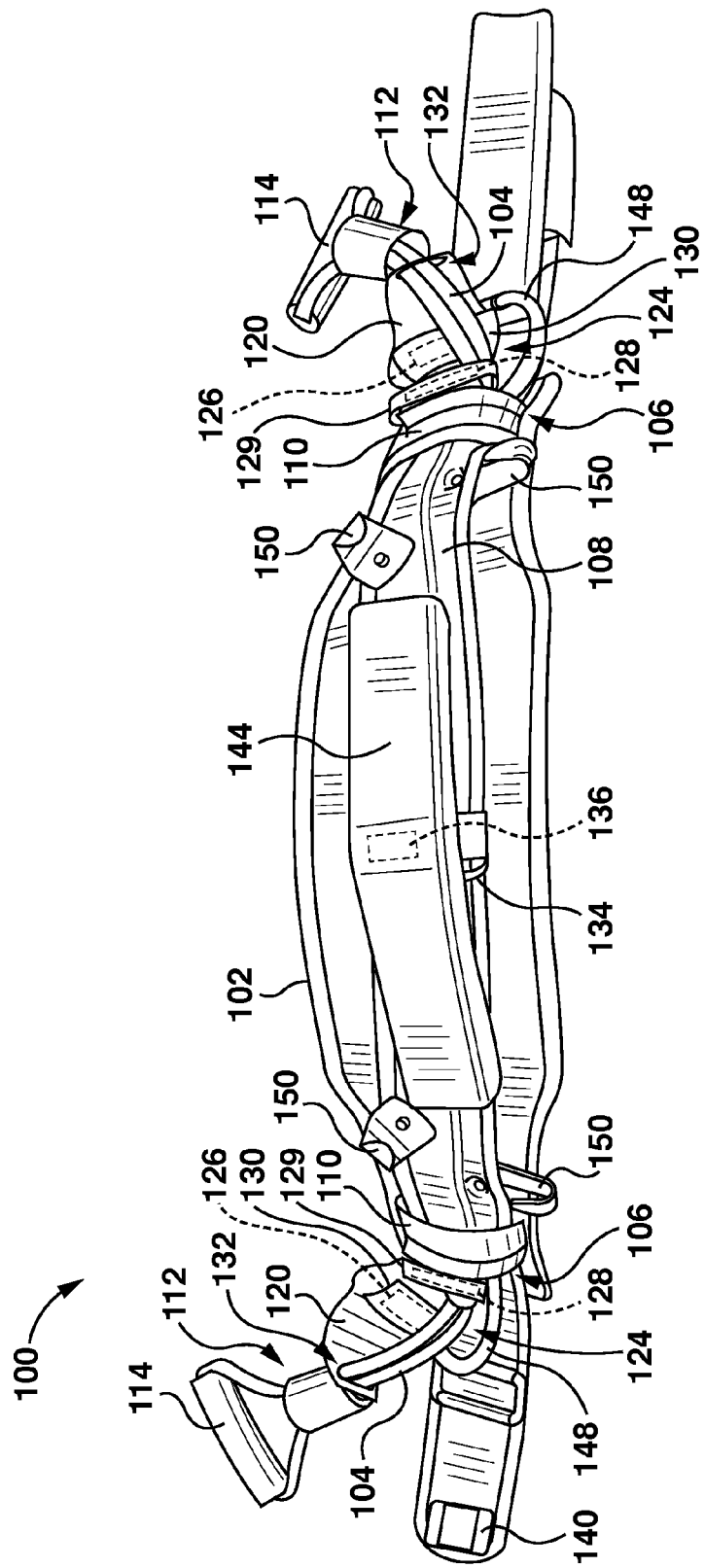
FIG. 1 is a perspective view of a first exemplary exercise system according to an aspect of the present disclosure.

Reference is now made to FIG. 1, which shows a first exemplary exercise system 100 according to an aspect of the present disclosure. In the exemplary exercise system 100 shown in FIG. 1, the anchor takes the form of a belt 102, which may be, for example, a suitably modified weightlifter's belt, which may be fastened around a user's waist in known manner, for example by way of a buckle or hook-and-loop fasteners such as those offered under the trademark "Velcro".

Two opposed extendible tethers 104 are coupled to the belt 102. In the illustrated embodiment, each of the extendible tethers 104 comprises a resilient cylindrical elastomeric resistance band which has been doubled over onto itself. Each of the extendible tethers 104 extends from a mooring 106 on the belt 102. In the illustrated embodiment, each of the extendible tethers 104 is anchored to the belt 102 inside a sleeve 108 having reinforced terminal cuffs 110 at each end, and thus the openings of the sleeves 108 form the moorings 106 in that the sleeve openings define the locations where the respective extendible tethers 104 are free to make substantial angular movements relative to the belt 102. Thus, in the illustrated embodiment, the extendible tethers 104 are not anchored to the belt 102 at the moorings 106 but can move longitudinally in and out of the openings of the sleeves 108. In other embodiments, the moorings may be locations where the extendible tethers are anchored. For example, in an embodiment where the sleeve is omitted from the belt, the mooring for each extendible tether may be the outermost position where that extendible tether is anchored to the belt. In the illustrated embodiment, each of the extendible tethers 104 comprises an individual resistance band, that is, there are two resistance bands: one for each of the extendible tethers 104. In other embodiments, a single resistance band may provide both of the extendible tethers, with each end of the single resistance band forming one of the extendible tethers; in such an embodiment the single resistance band may be doubled over as well. In still further embodiments, multiple resistance bands may be used to form each extendible tether. Each extendible tether may be anchored to the belt at a single point or at multiple points.

Figure 1A:
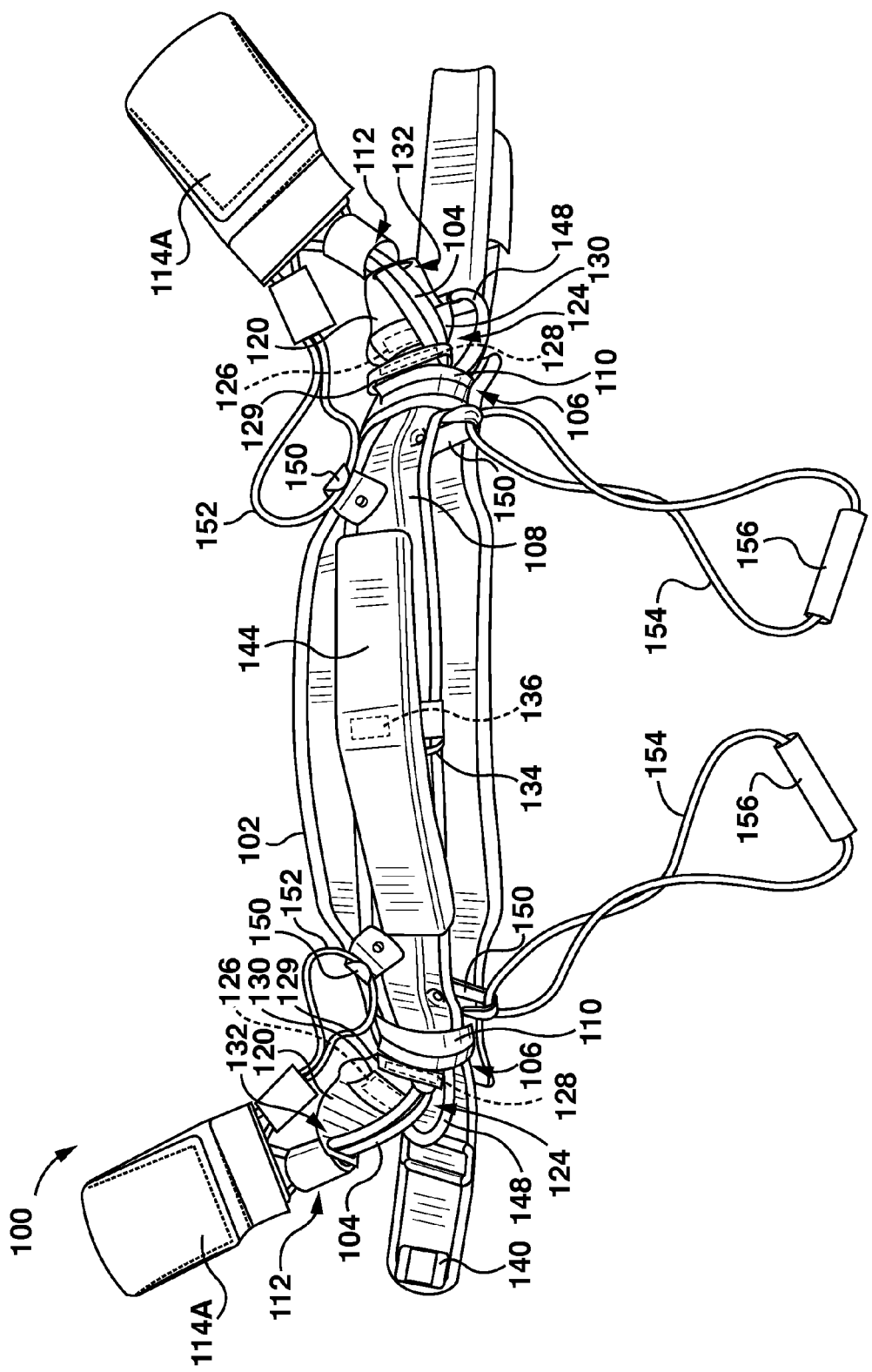
FIG. 1A is a perspective view of the exercise system of FIG. 1, showing additional resistance bands and mixed martial arts gloves releasably received thereon.
Figure 1B:
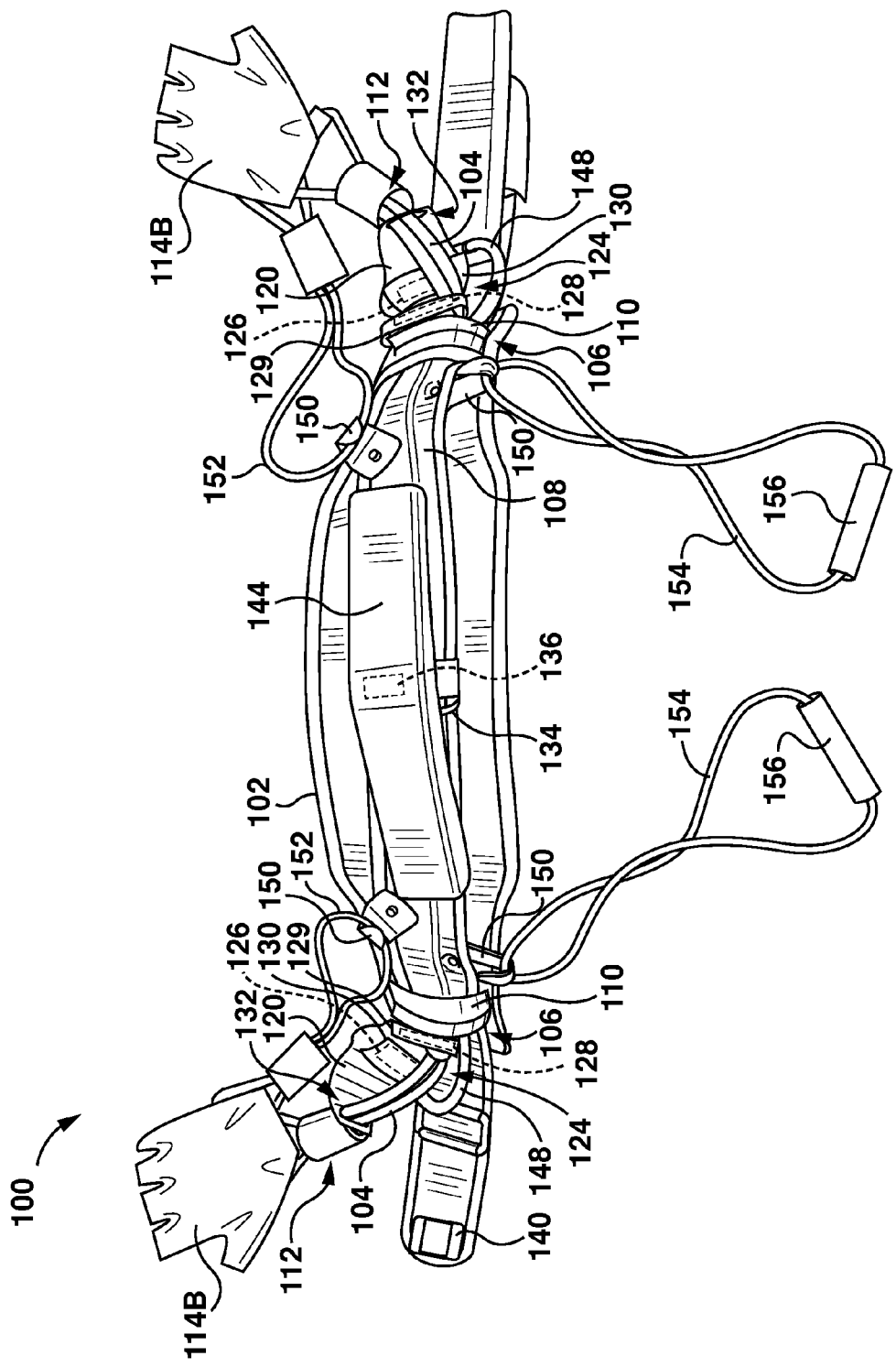
FIG. 1B is a perspective view of the exercise system of FIG. 1, showing additional resistance bands and weightlifting gloves releasably received thereon.

Each of the extendible tethers 104 extends from a respective one of the moorings 106 on the belt 102 to a grip end 112 having a grip element. In the illustrated embodiment shown in FIG. 1, the grip elements take the form of flexible padded cylindrical handgrips 114. In other embodiments, the grip elements may be gloves, such as a mixed martial art (MMA) style gloves 114A as shown in FIG. 1A or weightlifter's gloves 114B as shown in FIG. 1B, or boxing gloves. In yet further embodiments, the grip elements may take other forms, such as balls, wrist straps, handles or grips of various types or even simple loops knotted into the extendible tethers 104. Each extendible tether 104 is longitudinally movable between an extended configuration and a retracted configuration. In the illustrated embodiment, since the extendible tethers 104 are formed by resilient resistance bands, the extended configuration is a stretched configuration and the retracted configuration is an unstretched or "rest" configuration.

In the illustrated embodiment, each of the moorings 106 is located at a position on the belt 102 that will be proximal to the user's hips or waist when the belt 102 is fastened about the user's waist. In this embodiment, the extendible tethers 104 will be positioned to provide exercise resistance to various arm movements when a user grasps the handgrips 114 or wears the gloves 114A, 114B. For example, a user may perform arm movements such as punches used in boxing or punches and other strikes used in MMA, pressing or extension movements such as push-ups or lateral raises, with the extendible tethers 104 providing resistance to those movements.

Continuing to refer to FIGS. 1, 1A, 1B and 2, two sensor alignment arms 120 are movably coupled to the belt 102 adjacent to respective ones of the moorings 106. Thus, each sensor alignment arm 120 is associated with a respective one of the extendible tethers 104. In the illustrated embodiment, each sensor alignment arm 120 is coupled to the belt 102 by a rotatable coupling 122 (see FIGS. 2 and 4A to 4C) so that it can rotate relative to the belt 102, and is also able to flex toward and away from the belt 102 and to twist in response to force applied to the sensor alignment arm 120 by the respective extendible tether 104. In the illustrated embodiment, the sensor alignment arms 120 are formed from a suitable flexible, resilient plastic to provide the desired flexibility; in other embodiments the sensor alignment arms may be substantially rigid and incorporate a flexible portion. In still further embodiments, the sensor alignment arms may be coupled to the belt by a ball joint or other coupling providing the required freedom of movement relative to the belt, and may be flexible, substantially rigid, or a combination thereof.

Figure 2:
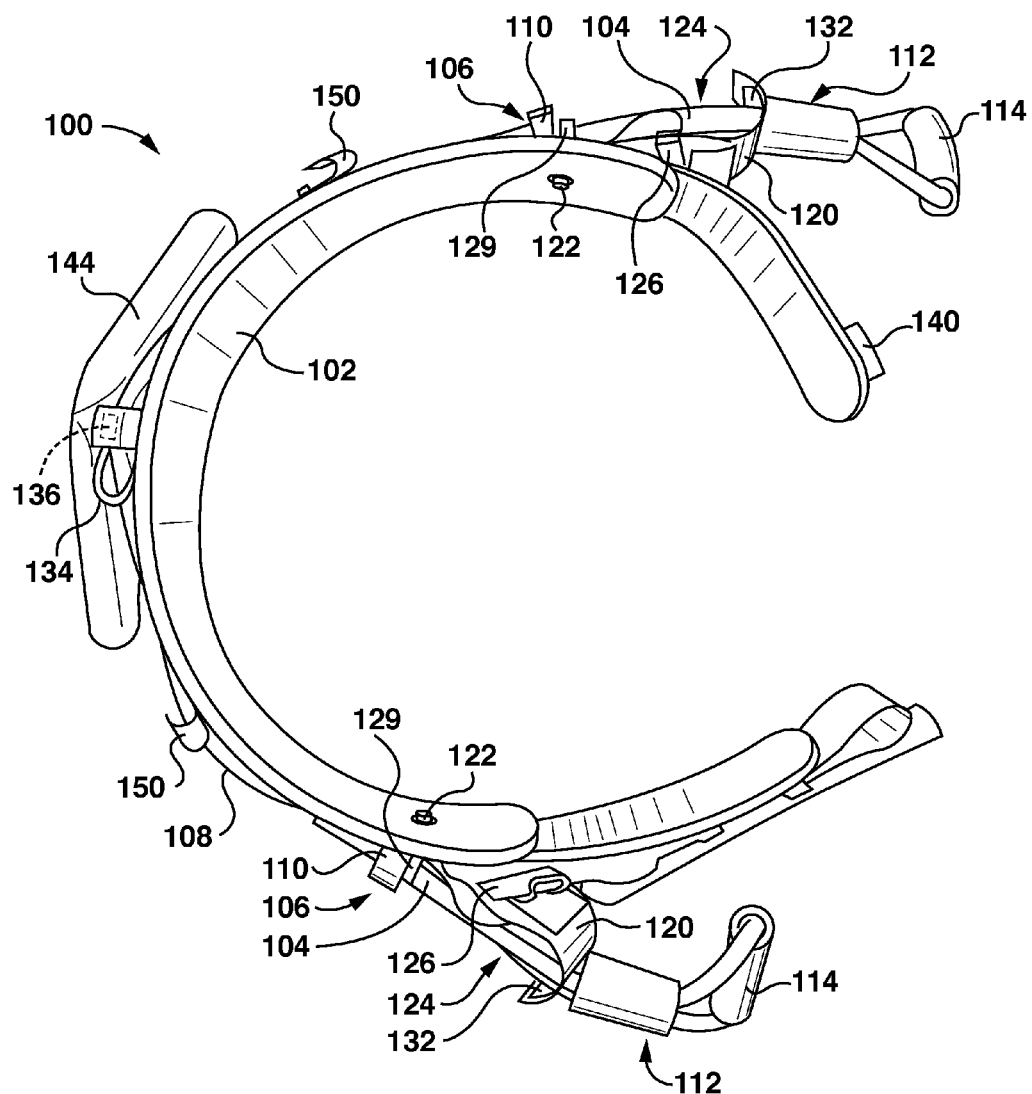
FIG. 2 is a plan view of the exercise system of FIG. 1.

In addition, the exercise system 100 further comprises two sensors 124, with each sensor 124 associated with a respective sensor alignment arm 120 and extendible tether 104. Thus, in the illustrated embodiment the exercise system has two opposed extendible tethers 104, two opposed sensor alignment arms 120 and two sensors 124, arranged as two associated groups, each group comprising one extendible tether 104, one sensor alignment arm 120 and one sensor 124. Each of the sensors 124 comprises a first sensor element carried by the respective sensor alignment arm 120 and a second sensor element carried by the respective extendible tether 104. The sensor 124 is adapted to detect movement of the second sensor element past the first sensor element in at least a first longitudinal direction. In the illustrated embodiment, each of the sensors 124 comprises a paired reed switch 126 and magnet 128, with the reed switch 126 being fixed to the respective sensor alignment arm 120 and the magnet 128 being fixed to the respective extendible tether 104. FIG. 2 shows the mounting for the reed switches 126, which are located under respective protective shrouds 130 (FIG. 1) on the sensor alignment arms 120; the reed switches 126 are shown in dashed lines in other Figures. Similarly, the magnets 128 are positioned inside mountings 129 secured to the extendible tethers 104 and are shown in dashed lines in the Figures. Thus, in this embodiment the reed switches 126 are the first sensor elements and the magnets 128 are the second sensor elements.

Reference is now made to FIGS. 3A to 4C. Each sensor alignment arm 120 is movably coupled to the respective extendible tether 104 so that the extendible tether 104 is longitudinally movable relative to the sensor alignment arm 120 through the guide aperture 132. In the illustrated embodiment, each sensor alignment arm 120 has a guide aperture 132, and the respective extendible tether 104 passes through the guide aperture 132. The guide aperture 132 is large enough so that the extendible tether 104 is longitudinally movable relative to the sensor alignment arm 120 through the guide aperture 132. The edges of the guide aperture 132 are smoothly beveled to reduce resistance to longitudinal motion of the extendible tether 104 through the guide aperture 132. Optionally, a suitable bushing or bearing (not shown) may be positioned in the guide aperture 132 to facilitate sliding movement of the respective extendible tether 104; the second exemplary exercise system 200 described further below includes such a bearing. The guide aperture 132 is further sized so that when the extendible tether 104 moves angularly relative to the belt 102, the respective extendible tether 104 will engage the inner surface of the guide aperture 132 to pull the sensor alignment arm 120 in a corresponding angular movement relative to the belt 102. Thus, angular movement of each extendible tether 104 and its associated sensor alignment arm 120 relative to the belt 102 will be substantially in unison (i.e. subject to any play between the extendible tether 104 and the guide aperture 132). Any play between the extendible tether 104 and the guide aperture 132 should be small enough to keep the reed switch 126 and magnet 128 in longitudinal alignment. Accordingly, angular movement of the extendible tether 104 relative to the belt 102 also moves the sensor alignment arm 120 relative to the belt to maintain longitudinal alignment between the sensor alignment arm 120 and the extendible tether 104. This in turn maintains longitudinal alignment between the reed switch 126 and the magnet 128. Therefore, when the extendible tether 104 moves between the extended configuration and the retracted configuration, the magnet 128 is constrained to move past the reed switch 126 and open the reed switch 126. Optionally, other embodiments may have circuit configurations where movement of the magnet 128 past the reed switch 126 closes the reed switch 126.

Figure 3A:
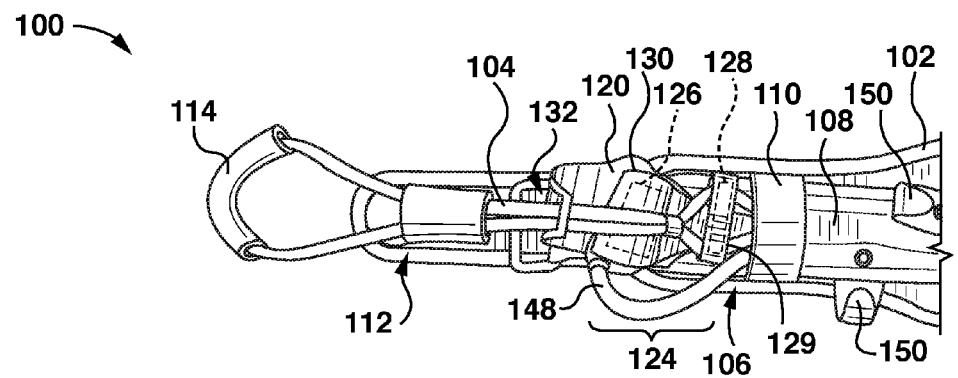
FIG. 3A shows a portion of the exercise system of FIG. 1 with an extendible tether and associated sensor alignment arm in a first angular position with the extendible tether in a retracted configuration.
Figure 3B:
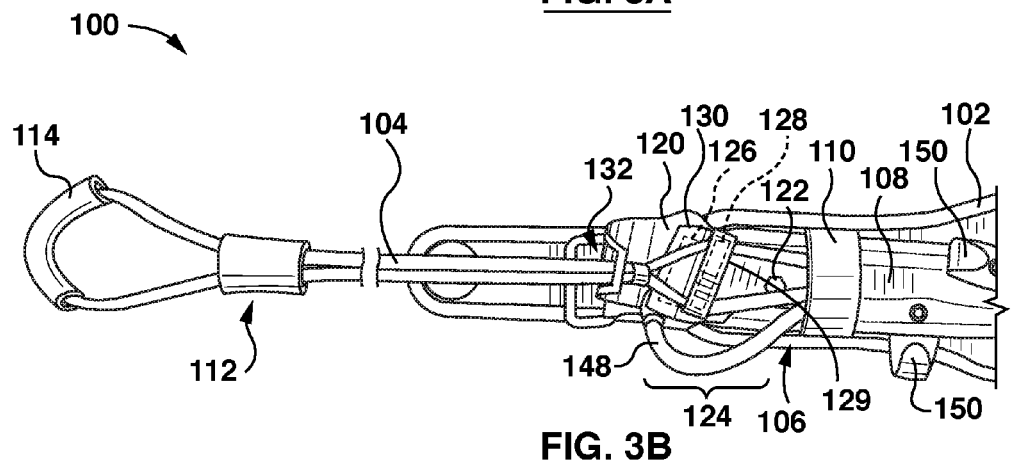
FIG. 3B shows a portion of the exercise system of FIG. 1 with the extendible tether and associated sensor alignment arm in the first angular position with the extendible tether moving between the retracted configuration and an extended configuration.
Figure 3C:
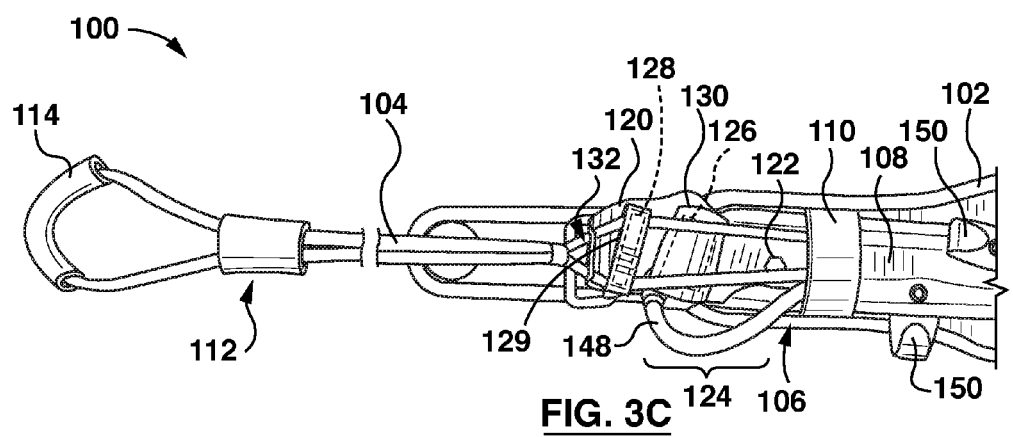
FIG. 3C shows a portion of the exercise system of FIG. 1 with the extendible tether and associated sensor alignment arm in the first angular position with the extendible tether in the extended configuration.
Figure 4A:
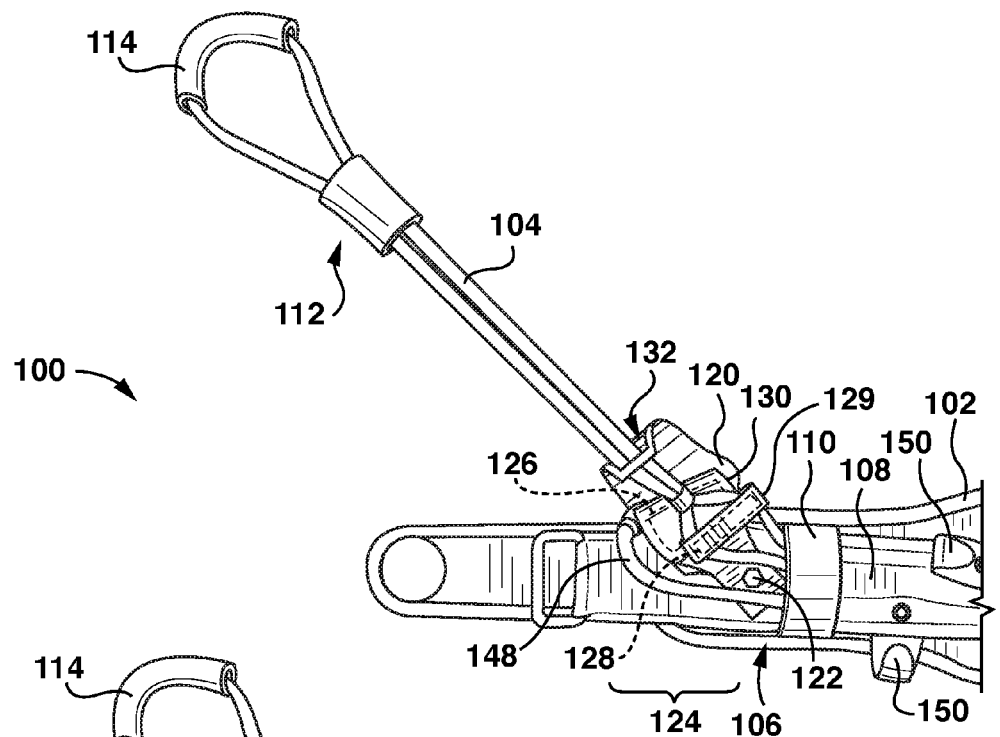
FIG. 4A shows a portion of the exercise system of FIG. 1 with the extendible tether and associated sensor alignment arm in a second angular position with the extendible tether in the retracted configuration.
Figure 4B:
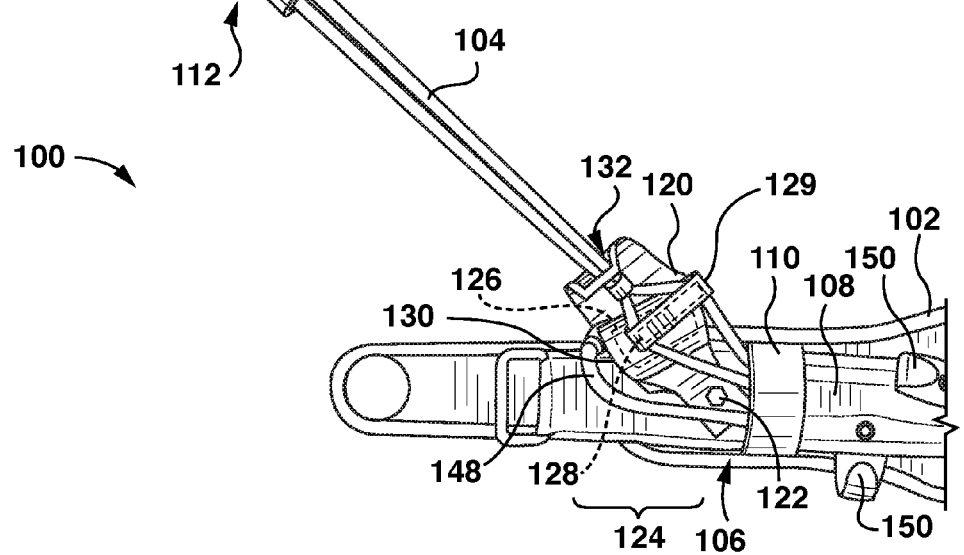
FIG. 4B shows a portion of the exercise system of FIG. 1 with the extendible tether and associated sensor alignment arm in the second angular position with the extendible tether moving between the retracted configuration and the extended configuration.
Figure 4C:
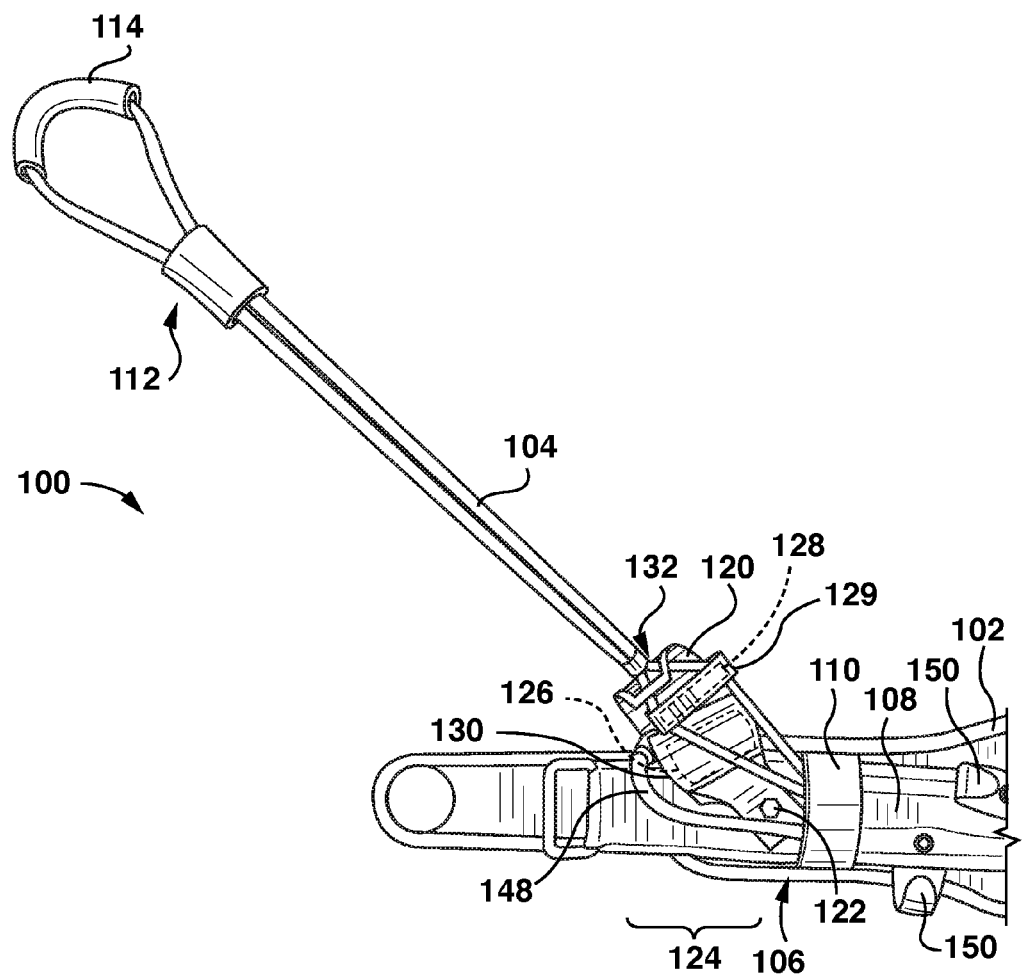
FIG. 4C shows a portion of the exercise system of FIG. 1 with the extendible tether and associated sensor alignment arm in the second angular position with the extendible tether in the extended configuration.

FIGS. 3A to 3C show an extendible tether 104 and the associated sensor alignment arm 120 in a first angular position relative to the belt 102 and FIGS. 4A to 4C show an extendible tether 104 and the associated sensor alignment arm 120 in a second angular position relative to the belt 102. FIGS. 3A and 4A show the extendible tether 104 in the retracted (unstretched) configuration, with the magnet 128 disposed inwardly of the reed switch 126, relative to the belt 102. FIGS. 3B and 4B show the extendible tether 104 moving between the retracted configuration and the extended (stretched) configuration, with the magnet 128 moving across the reed switch 126 to activate the reed switch 126. FIGS. 3C and 4C show the extendible tether 104 in the extended configuration, with the magnet 128 disposed outwardly of the reed switch 126, relative to the belt 102.

Opening or closing (i.e. activating) the reed switch 126 provides an electrical signal that the associated extendible tether 104 has moved between the extended configuration and the retracted configuration. Such electrical signals can be used to gather data about the manner in which the exercise system 100 is being used. For example, the electrical signals may be used to count the number of repetitions (e.g. exercises or strikes), measure the duration of each repetition or strike, and the time between repetitions or strikes. For boxing or MMA training, the duration of a strike (the time between consecutive paired actuations of the same reed switch 126) can be used to calculate a strike velocity value. The gathered data can in turn be used for further calculations, such as estimating the number of calories burned during a given period. To facilitate this data gathering, the reed switches 126 may be coupled to an external computing device. In the illustrated embodiment, the reed switches 126 are coupled by wires 134 (FIGS. 1, 1A, 1B) to a wireless transmitter 136, which, when a reed switch 126 is activated, transmits wireless signals to an external computing device in the form of a wireless cyclocomputer console 140 that uses the wireless signals to determine and display performance data, such as calories burned, number of repetitions (e.g. exercises or strikes), duration of each repetition or strike, time between repetitions or strikes and strike velocity values. The wireless transmitter 136 is carried by the belt 102; in particular, the wireless transmitter 136 is secured to the sleeve 108 and covered by a protective pad 144. The wires 134 pass through the sleeve 108 and emerge from an aperture therein to reach the wireless transmitter 136; the portions of the wires 134 extending between the terminal cuffs 110 and the reed switches 126 are covered by flexible protective sheaths 148. The cyclocomputer console 140 is also carried by the belt 102; in the illustrated embodiment the cyclocomputer console 140 is releasably mounted to the belt 102 by hook-and-loop fasteners such as those offered under the trademark "Velcro".

Although in the illustrated embodiment the external computing device is a cyclocomputer console 140, in other embodiments the sensors may communicate with more sophisticated external computing devices, such as a smartphone, tablet, laptop, desktop or other type of computer executing appropriate software, or other suitable types of processing hardware. For example, a smartphone or tablet may be provided with an application configured to run on the iOS or Android operating systems, or a desktop or laptop computer can be provided with appropriate software configured for Windows or Mac OS operating systems. Any suitable type of wireless transmission may be used, for example known protocols such as Wi-Fi, FM radio or Bluetooth may be used. Moreover, while in the illustrated embodiment the sensors are coupled to a wireless transmitter, in other embodiments they may be coupled directly by wire to a suitable computing device or other suitable types of processing hardware.

Reference is now made to FIGS. 5A to 7C, which show a portion of a second exemplary exercise system 200 according to the present disclosure. The second exemplary exercise system 200 shown in FIGS. 5A to 7C is similar to the first exemplary exercise system 100 shown in FIGS. 1 to 4C, with like reference numerals denoting corresponding features except with the prefix "2" instead of "1". Hence, in the second exemplary exercise system 200, the belt is denoted by reference 202, the extendible tethers are denoted by reference 204, and so on.

The second exemplary exercise system 200 shown in FIGS. 5A to 7C differs from the first exemplary exercise system 100 shown in FIGS. 1 to 4C in the structure and arrangement of the alignment arms 220 and in the manner in which the sensors 224 are carried. As with the first exemplary exercise system 100, the sensors 224 of the second exemplary exercise system 200 may communicate with a cyclocomputer, or with more sophisticated external computing devices, such as a smartphone, tablet, laptop, desktop or other type of computer executing appropriate software, or other suitable types of processing hardware.

As noted above, the second exemplary exercise system 200 incorporates a rotatable bearing 258 in each of the guide apertures 232; the bearings 258 may each be, for example, a coil spring that can be threaded onto the outer edge of the respective alignment arm 220 at the distal end 268 thereof as shown.

In addition, in the second exemplary exercise system 200 each of the first sensor elements, that is, the magnets 228, are mounted on respective sensor carriers 260 that are in turn carried by the respective extendible tethers 204. The sensor carriers 260 are curved, with the magnets 228 disposed in the outwardly facing concavity so as to be positioned between the sensor carriers 260 and the extendible tethers 204; the magnets 228 are secured in an enclosure 262. The sensor alignment arms 220 are formed from a suitable flexible, resilient plastic, with the distal portions (the portions furthest from the sleeve end cuffs 220) being reinforced so as to be more rigid (e.g. a 2:1 ratio) than the proximal portions (the portions closest to the sleeve end cuffs 220). As best seen in FIGS. 7A to 7C, the shrouds 230 which protect the reed switches 226 take the form of sloped or curved guide ramps which can serve as travel surfaces for the sensor carriers 260 when the sensor alignment arms 220 are flexed outwardly away from the belt 202. In the second exemplary exercise system 200, the sensor alignment arms 220 each incorporate a guide tube 263 and a divider post 264 (shown in FIGS. 6A and 6B) extends into each guide tube 263 to enforce separation between the doubled-over strands of the resistance bands that form the extendible tether 204. The divider post 264 may be an extension of part of the rotatable coupling that rotatably secures the sensor alignment arms 220 to the belt 202.

Each of the sensor carriers 260 has two pairs of side-by-side tether openings 266 arranged in opposed relation to one another at the ends of the sensor carriers 260. As with the first exemplary exercise system 100, in the second exemplary exercise system 200, each of the extendible tethers 204 comprises a resilient cylindrical elastomeric resistance band which has been doubled over onto itself; the strands of each of the resistance bands pass through the tether openings 266 in each of respective the sensor carriers 266. The outer diameter of the strands of each of the resistance bands will be larger when the respective extendible tether 204 is in the retracted, unstretched configuration than when the respective extendible tether 204 is in the extended, stretched configuration. The tether openings 266 are sized, relative to the variable outer diameter of the resistance band, so that as the extendible tether 204 moves between the retracted/unstretched (rest) configuration and the extended/stretched configuration, the outer diameter of the resistance band is reduced from a size that forms an interference fit with the tether openings 266 to a size that can slide within the tether openings 266. Thus, during an initial portion of the outward stroke from the retracted/unstretched configuration to the extended/stretched configuration, each sensor carrier 260 will be fixed to and carried by the respective extendible tether 204 due to the interference fit, and during a final portion of the outward stroke from the retracted/unstretched (rest) configuration to the extended/stretched configuration, each sensor carrier 260 and its respective extendible tether 204 can move independently of one another. Conversely, during an initial portion of the return stroke from the extended/stretched configuration to the retracted/unstretched (rest) configuration, each sensor carrier 260 and its respective extendible tether 204 can move independently of one another, and during a final portion of the return stroke from the extended/stretched configuration to the retracted/unstretched (rest) configuration, each sensor carrier 260 will be fixed to and carried by the respective extendible tether 204 due to the interference fit. This brings the first sensor element (magnet 228) affixed to the sensor carrier 260 back to its initial rest or retracted position, coupling with the second sensor element (reed switch 226).

Figures 5A, 5B, 5C:
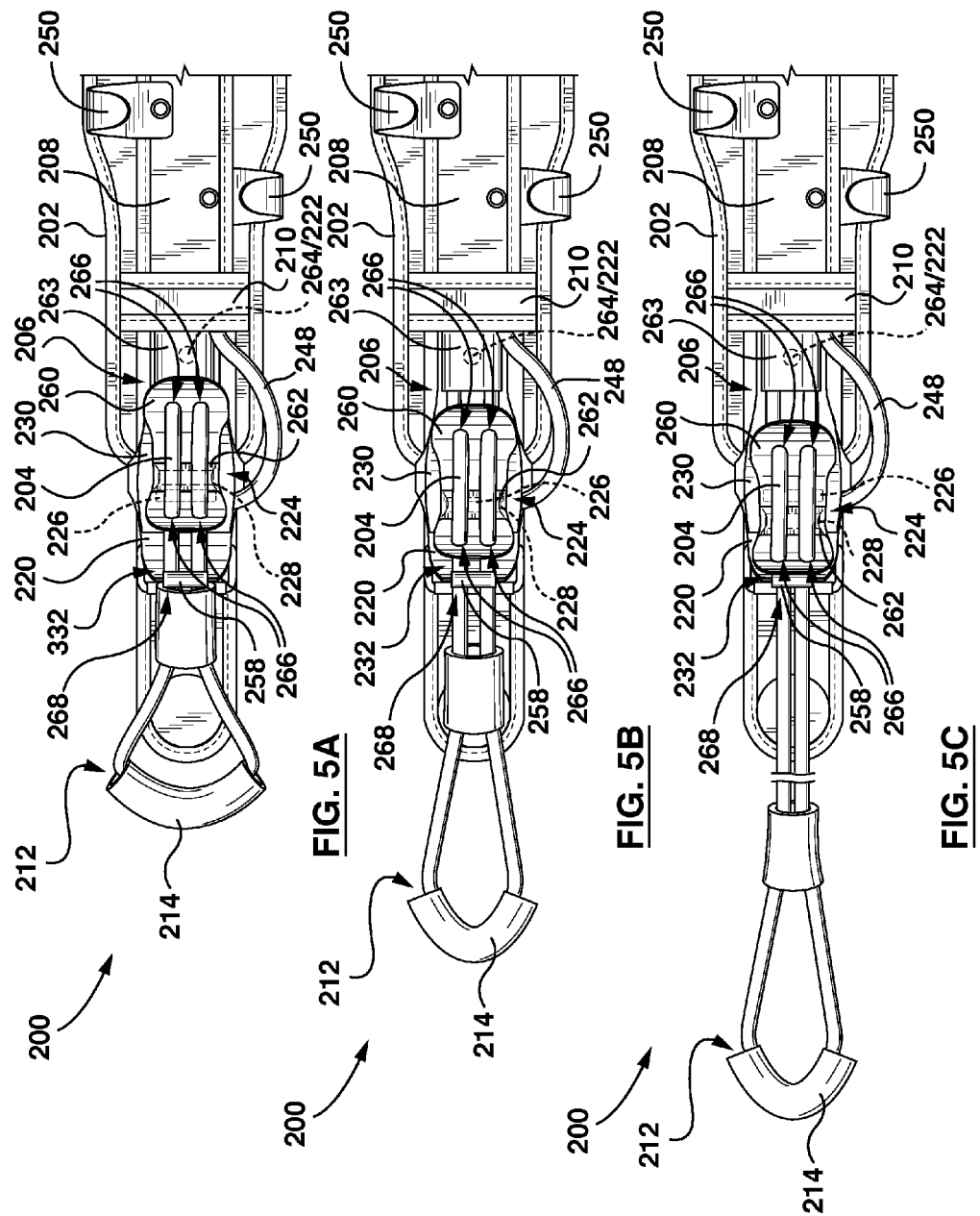
FIG. 5A shows a portion of a second exemplary exercise system according to an aspect of the present disclosure with an extendible tether and associated sensor alignment arm in a first angular position with the extendible tether in a retracted configuration.
FIG. 5B shows a portion of the exercise system of FIG. 5A with the extendible tether and associated sensor alignment arm in the first angular position with the extendible tether moving between the retracted configuration and an extended configuration.
FIG. 5C shows a portion of the exercise system of FIG. 5A with the extendible tether and associated sensor alignment arm in the first angular position with the extendible tether in the extended configuration.

Reference is now made to FIGS. 5A to 5C and FIGS. 7A to 7C. FIGS. 5A to 5B and 7A to 7B show the initial portion of the outward stroke, during which the sensor carrier 260 is carried outwardly by the extendible tether 204 due to the interference fit. FIGS. 5A and 7A show the extendible tether 204 in the retracted (unstretched) configuration, with the magnet 228 disposed inwardly of the reed switch 226, relative to the belt 202. FIGS. 5B and 7B show the extendible tether 204 moving between the retracted configuration and the extended (stretched) configuration, with the magnet 228 moving across the reed switch 226 to activate the reed switch 226. FIGS. 5C and 7C show completion of the initial portion of the outward stroke, with the magnet 228 disposed outwardly of the reed switch 226, relative to the belt 202. At completion of the initial portion of the outward stroke, the outer diameter of the strands of the resistance band will have been reduced to a size that can slide within the tether openings 266, allowing the extendible tether 204 to continue to move toward the extended configuration during the final portion of the outward stroke even though further outward movement of the sensor carrier 260 is obstructed by the curved distal end 268 of the sensor alignment arm 220. Conversely, during the initial portion of the return stroke, the strands of the resistance band can slide within the tether openings 266 with little or no movement of the sensor carrier 260, and during the final portion of the return stroke the strands of the resistance band will engage the tether openings 266 in an interference fit so that the sensor carrier 260 is fixed to and carried by the extendible tethers 204 to return to its original position, as shown in FIGS. 5A and 7A. Thus, the sensor carrier 260 is trapped between the curved distal end 268 of the sensor alignment arm 220 and the crest 270 of the shroud 230 (or the guide tube 263), and reciprocates therebetween as the extendible tether 204 reciprocates between the retracted configuration and the extended configuration. This facilitates movement of the magnet 228 across the reed switch 226 with each stroke even if the strokes are not of precisely the same length each time.

Although not shown in FIGS. 5A to 7C, the reed switches 226 may be coupled by wires to a wireless transmitter which, when a reed switch 226 is activated, transmits wireless signals to an external computing device, or may be coupled directly by wire to a suitable computing device or other suitable types of processing hardware. For example, in one implantation of the second exemplary exercise system 200 the reed switches 226 are coupled to a Bluetooth/Arduino wireless transmitter which conveys the user's activity to a smartphone executing an application that computes, displays and stores that activity.

In the illustrated embodiments, the magnets 128, 228 are carried by the extendible tethers 104, 204 and the reed switches 126, 226 are carried by the sensor alignment arms 120, 220; this is one preferred configuration because it simplifies connection of the reed switch 126, 226 to the wireless transmitter (e.g. wireless transmitter 136). However, this configuration may be reversed, with the reed switch carried by the extendible tether and the magnet carried by the sensor alignment arm. Furthermore, while in the illustrated embodiments the sensors associated with each respective sensor alignment arm 120, 220 and extendible tether 104, 204 each comprise a paired reed switch 126, 226 and magnet 128, 228, this is merely one exemplary type of sensor. Any two-element sensor may be used as long as it is adapted to detect movement of the second sensor element past the first sensor element in at least a first longitudinal direction as the extendible tether moves between the extended configuration and the retracted configuration. For example, in some alternative embodiments an optical sensor comprising an optical detector such as a CMOS or CCD camera and a visible detection element such as a specialized marking may be used. Other alternative embodiments may employ magnetic switches, mini magnetic switches, reed relays, micro switches, conventional switches, proximity switches, electronic relays, momentary contact actuators, or limit switches.

For example, in one embodiment employing a physical switching arrangement, each sensor alignment arm may include a guide slot, and a guide pin may be secured to the extendible tether, with the guide pin sliding along the guide slot as the extendible tether moves between the extended configuration and the retracted configuration. A physical switch can be positioned so that the guide pin will actuate the switch as the guide pin slides along the guide slot. Thus, in this alternate embodiment, the physical switches are the first sensor elements and the guide pins are the second sensor elements. In such an embodiment, the physical switch may be, for example, a Z15G1744 micro switch. Because the guide pin will slide along the guide slot as the extendible tether moves between the extended configuration and the retracted configuration, the extendible tether will be longitudinally movable relative to the sensor alignment arm through the guide aperture. When the extendible tether moves angularly, it will pull the guide pin into engagement with the longitudinal edge of the guide slot so as to move the sensor alignment arm and maintain longitudinal alignment between the sensor alignment arm and the extendible tether. This will in turn maintain longitudinal alignment between the switch (first sensor element) carried by the sensor alignment arm and the guide pin (second sensor element) carried by the extendible tether.

In the illustrated embodiments, the belts 102, 202 are also provided with anchor points in the form of rigid hooks 150, 250 secured to the belts 102, 202 for receiving additional resistance bands. As shown in FIGS. 1A and 1B, additional resistance bands 152 may be coupled to the grip elements, such as the gloves 114A, 114B and extend between the grip elements and the hooks 150 to supplement the resistance provided by the extendible tethers 104. As also shown in FIGS. 1A and 1B, additional resistance bands 154 may extend from the hooks 150 to separate, discrete grip elements 156, for example to provide for leg exercises. Other types of anchor points may be used instead of hooks, for example loops or carabiners. Each hook 150, 250 is rotatable so that its orientation is adjustable to accommodate the additional resistance bands (e.g. resistance bands 152, 154).

In the exemplary embodiments, the anchor takes the form of a belt 102, 202; this is merely one exemplary type of anchor. In other embodiments, the anchor may be, for example, a chest strap, a vest, or a wall anchor, chair anchor or door anchor. Similarly, while resistance bands have been used to provide the extendible tethers 104, 204 in the exemplary embodiments, in other embodiments other types of extendible tethers may be used. For example, the extendible tether may be a retractable cable on a resistance flywheel, in which case the extended configuration is one in which the cable is extended from the flywheel and the retracted configuration is one in which the cable is wound about the flywheel.

Moreover, while the exemplary embodiments described herein have included two extendible tethers 104, 204 with respective associated sensors 124, 224, it is contemplated that in other embodiments there may be only a single extensible tether and associated sensor, or more than two extendible tethers with respective associated sensors. For example, alternate embodiments may include four extendible tethers with respective associated sensors, with two extendible tethers being for the arms and two being for the legs.

Moreover, an exercise system according to an aspect of the present disclosure may incorporate additional sensors, which may also be coupled to an external computing device. For example, a heart rate monitor may be coupled to an external computing device, or additional sensors such as accelerometers may be placed in or on the alignment arms and/or grip elements and coupled to an external computing device. Exercise systems according to aspects of the present disclosure can accommodate one or more sensors and/or a combination of sensor types such as but not limited to accelerometers, gyroscopes, and position sensors to measure expenditure of energy in calories and distinguish between types of movement and activity, for example to distinguish among various motions and strikes, including punches such as upper cuts, crosses, hooks, and kicks such as round house, side kick, front kick, and exercises such as presses, lateral raises, curls and so forth.

Thus, several embodiments have been described by way of example. It will be apparent to persons skilled in the art that a number of variations and modifications can be made without departing from the scope of the claims.

What is claimed is:

1. An exercise system, comprising:
   an anchor;
   at least one extendible tether coupled to the anchor and extending from a mooring on the anchor to a grip end having a grip element;
   each extendible tether being longitudinally movable between an extended configuration and a retracted configuration;
   at least one sensor alignment arm movably coupled to the anchor;
   at least one sensor, each sensor being associated with a respective sensor alignment arm and extendible tether, each sensor comprising a first sensor element and a second sensor element, wherein:

the first sensor element is carried by the sensor alignment arm; and the second sensor element is carried by the extendible tether;

each sensor alignment arm being movably coupled to a respective one of the at least one extendible tether so that:

the extendible tether is longitudinally movable relative to the sensor alignment arm; and angular movement of the extendible tether relative to the anchor moves the sensor alignment arm relative to the anchor to maintain longitudinal alignment between the sensor alignment arm and the extendible tether and thereby maintain longitudinal alignment between the first sensor element and the second sensor element of each sensor;

each sensor being adapted to detect movement of the second sensor element past the first sensor element in at least a first longitudinal direction as the extendible tether moves between the extended configuration and the retracted configuration.

2. The exercise system of claim 1, wherein the anchor is a belt.

3. The exercise system of claim 2, wherein the exercise system has two opposed extendible tethers, two opposed sensor alignment arms and two sensors.

4. The exercise system of claim 3, wherein each extendible tether comprises a resistance band.

5. The exercise system of claim 4, further comprising anchor points on the belt for receiving additional resistance bands.

6. The exercise system of claim 1, wherein the at least one sensor is coupled to an external computing device.

7. The exercise system of claim 6, wherein the external computing device is releasably carried by the anchor.

8. The exercise system of claim 1, wherein the at least one sensor is coupled to a wireless transmitter.

9. The exercise system of claim 8, wherein the wireless transmitter is carried by the anchor.

* * * * *